United States Patent [19]

Ozaki et al.

[11] 3,865,866
[45] Feb. 11, 1975

[54] CARBAMIC ACID ESTERS

[75] Inventors: Toshiaki Ozaki; Katsuzo Kamoshita, both of Toyonaka; Katsutoshi Tanaka, Takarazuka; Sigeo Yamamoto, Toyonaka; Tadashi Ooishi; Shinji Nakai, both of Takarazuka; Keiichiro Akiba, Ikeda, all of Japan

[73] Assignee: Sumitomo Chemical Company, Limited, Osaka, Japan

[22] Filed: Jan. 25, 1971

[21] Appl. No.: 109,622

[30] Foreign Application Priority Data
Jan. 30, 1970 Japan.................................. 45-8618
Feb. 20, 1970 Japan................................ 45-15120
Mar. 19, 1970 Japan................................ 45-23730
Mar. 24, 1970 Japan................................ 45-25119
Apr. 13, 1970 Japan................................ 45-31694
Apr. 13, 1970 Japan................................ 45-31695

[52] U.S. Cl....... 260/471 C, 260/347.3, 260/465 D, 260/332.2 A, 260/239 E, 260/543 R, 424/275, 424/285, 424/300, 424/304, 71/88, 71/90, 71/98, 71/105, 71/106
[51] Int. Cl...................... C07c 79/46, C07c 101/00
[58] Field of Search.......... 260/332.2, 347.2, 347.4, 260/465, 470, 471

[56] References Cited
UNITED STATES PATENTS
2,804,381 8/1957 Garman et al.................... 260/347.4
2,840,484 6/1958 Gerbaux............................. 260/471
3,376,335 4/1968 Goliash et al..................... 260/347.4
3,589,889 6/1971 Braxton et al........................ 71/111

FOREIGN PATENTS OR APPLICATIONS
1,068,056 5/1967 Great Britain...................... 260/471
6,900,037 6/1969 South Africa....................... 260/471
982,235 0/1965 Great Britain...................... 260/471

OTHER PUBLICATIONS
Iwakura et al., J. Org. Chem., Vol. 26, p. 4384-4388, (1961).
Balba et al., J. Agr. Food Chem., Vol. 16, p. 821-25, (1968).

*Primary Examiner*—Harry I. Moatz
*Attorney, Agent, or Firm*—Stevens, Davis, Miller & Mosher

[57] ABSTRACT

A carbamic acid ester, which is useful as fungicidal agent, having the formula (I)

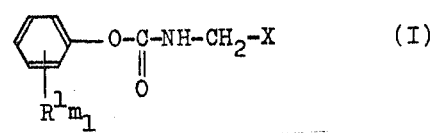

(I)

wherein $R^1$ is a halogen atom or a nitro, lower alkyl, lower alkoxy, lower alkylthio, cyano, sulfonamide, lower alkylsulfinyl or lower alkylsulfonyl group, and groups represented by $R^1m_1$ may be same or different; $m_1$ is an integer of 1 to 5; and X is a furyl or thienyl group or a group of the formula,

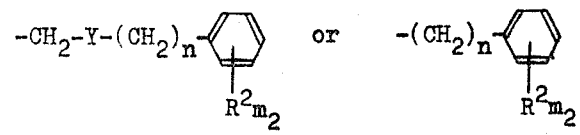

wherein Y is an oxygen or sulfur atom; $R^2$ is a hydrogen atom, a halogen atom, an alkyl group or an alkoxy group; $m_2$ is an integer of 1 to 5; and $n$ is 0 or 1. The compound is produced by i. reacting a phenylchloroformate having the formula,

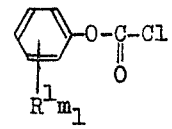

with a methylamine derivative having the formula,
$$H_2N-CH_2-X$$

ii. reacting a phenol having the formula,

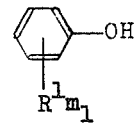

with an isocyanate derivative having the formula,
$$OCN-CH_2-X$$

or iii. reacting a phenyl-N,N-ethylenecarbamate having the formula,

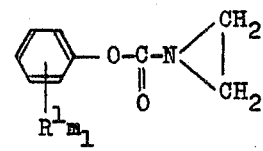

with a phenol, a thiophenol or a mercaptan having the formula,

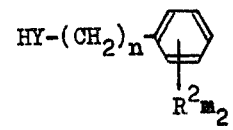

iv. reacting a carbamyl chloride having the formula,

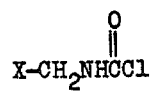

with a phenol having the formula,

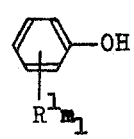

wherein $R^1$, $R^2$, $m_1$, $m_2$, $n$, X and Y are as defined above.

5 Claims, No Drawings

CARBAMIC ACID ESTERS

This invention relates to novel fungicidal agents. More particularly, it pertains to novel carbamic acid ester having the formula (I),

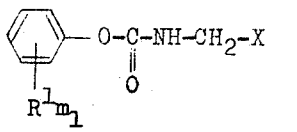

(I)

wherein $R^1$ is a halogen atom or a nitro, lower alkyl, lower alkoxy, lower alkylthio, cyano, sulfonamide, lower alkylsulfinyl or lower alkylsulfonyl group, and groups represented by $R^1 m_1$ may be same or different; $m_1$ is an integer of 1 to 5; and X is a furyl or thienyl group or a group having the formula

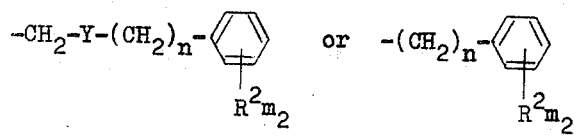

wherein Y is an oxygen or sulfur atom; $R^2$ is a hydrogen atom, a halogen atom, an alkyl group or an alkoxy group; $m_2$ is an integer of 1 to 5; and $n$ is 0 or 1, to process for the production of them and to method of use of them.

As compounds similar in structure to the present compounds, there have been known such compounds as mentioned below (refer to, for example, Japanese Pat. Publication No. 27341/1968).

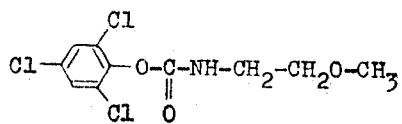

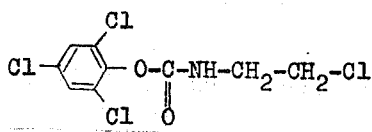

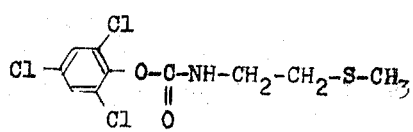

According to the experiments carried out by the present inventors, however, it has been clarified that the present compounds are more excellent in fungicidal activity than the above-mentioned known compounds.

The carbamic acid esters represented by the aforesaid formula (I) are chemicals which are particularly suitable for the control of plant diseases. They can most effectively control or exterminate such plant disease as rice blast, and further have activities against rice sheath blight, rice helminthosporium leaf spot, rice bacterial leaf blight, cucumber anthracnose, powdery mildew, vegetable sclerotinia rot, etc. Moreover, they have activities not only on plant pathogenic fungi but also on other injurious fungi such as molds, or bacteria, etc.

The novel carbamic acid esters of the present invention can be produced by various modes of reactions, for example, they can be produced by (1) reacting a phenylchloroformate having the formula (II),

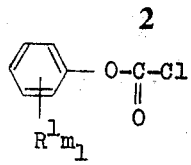

(II)

with a methylamine derivative having the formula (III), $$H_2N-CH_2-X,$$

(III)

or (2) reacting a phenol having the formula (IV),

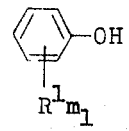

(IV)

with an isocyanate derivative having the formula (V), $$OCN-CH_2-X,$$

(V)

or (3) reacting a phenyl-N,N-ethylenecarbamate having the formula (VI),

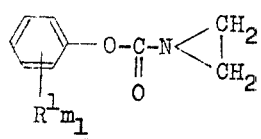

(VI)

with an alcohol or mercaptan having the formula (VII),

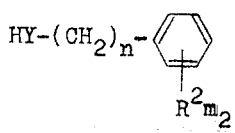

(VII)

or (4) reacting a carbamyl chloride having the formula (VIII),

(VIII)

with a phenol having the formula (IX),

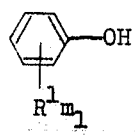

(IX)

wherein $R^1$, $R^2$, $m_1$, $m_2$, X, Y and $n$ are as defined above. These reactions are described in more detail as follows.

The reaction of phenylchloroformate derivative with methylamine derivative is carried out, for example, by dissolving a phenylchloroformate having the formula (II) in an inert organic solvent such as benzene or toluene, dropping into the resulting solution a methylamine derivative having the formula (III) in an amount equimolar to the chloroformate, and further dropping therein an equimolar amount of a dehydrochlorinating agent, e.g. a tertiary amine such as triethylamine or pyridine. The reaction temperature is variable within a wide range, and can suitably be decided as occasion demands. The phenylchloroformate represented by the formula (II) which is used as a starting material can be easily synthesized from a corresponding phenol and phosgene.

The reaction of phenol derivative with isocyanate derivative is carried out, for example, by dissolving a phenol having the formula (IV) in an inert organic solvent such as benzene or toluene, and mixing the resulting solution with an isocyanate derivative represented by the formula (V) to obtain a desired carbamic acid ester (I). In this case, the reaction readily progresses in the presence of a catalytic amount of a tertiary amine, e.g. triethylamine.

The reaction of phenyl-N,N-ethylenecarbamate with alcohol or mercaptan derivative is carried out, for example, by dissolving a phenyl-N,N-ethylenecarbamate having the formula (VI) in an inert organic solvent such as ether, benzene or toluene, and reacting the resulting solution with an alcohol or mercaptan derivative having the formula (VII) to obtain a desired carbamic acid ester (I), wherein X is a group of the formula:

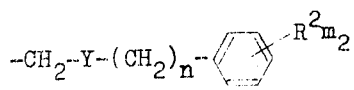

in which Y, $R^2$, $m_2$ and $n$ have the same meanings as defined above. The reaction temperature is variable within a wide range and can suitably be decided as occasion demands. The starting phenyl-N,N-ethylenecarbamate can be synthesized from a corresponding phenylchloroformate and ethyleneimine.

The reaction of carbamyl chloride with phenol is carried out, for example, by dissolving a phenol having the formula (IX) in an inert organic solvent such as organic tertiary amines, and reacting the resulting solution with a carbamyl chloride having the formula (VIII) to obtain a desired carbamic acid ester (I).

The thus obtained carbamic acid esters represented by the formula (I) are low in toxicity to mammals and fishes, however, they exterminate injurious microorganisms and prevent other substances than the human body from the attack of injurious microorganisms. Accordingly, they are quite safe in application and are extremely useful in various fields as agricultural, horticultural and the like fungicides high in disease-controlling effect.

As the result of further studies, the inventors have found such a surprising fact that the present compounds display strong microbicidal activities against other microorganisms of an entirely new field than the plant pathogenic fungi. That is, the present compounds are expected to be utilized as detergents for wood, bamboo products, textiles, paper products, etc. These applications are entirely different in scope from those in the fields of agriculture and horticulture. In such cases, therefore, not only the fungi to be controlled are naturally different in kind, but also the modes of application of the compounds are different.

In addition to such widely utilizable fungicidal characteristics as mentioned above, the present compounds are excellent in that they are less toxic to warm-blooded animals and that at practical concentrations, they do not irritate the skin. The present compounds have fungicidal actions on both Gram-positive and -negative fungi.

The present compounds are soluble in almost all of the organic solvents, and may also be used together with hydrophilic or water immiscible solvents such as, for example, benzene, xylene, ether, dioxane, acetone, methyl isobutyl ketone, cyclohexanone, isophorone, chloroform, trichloroethane, methyl cellosolve, ethyl cellosolve, butyl cellosolve, dimethylformamide, dimethyl sulfoxide, acetonitrile and methylnaphthalene.

In actual application, the present compounds may be used in pure forms without addition of other components. Alternatively, the compounds may be used in admixture with carriers, for easier application as fungicides, and can be formulated into any of the ordinarily adopted forms such as, for example, dusts, wettable powders, emulsifiable concentrates, granules, oil sprays and aerosols. The carriers to be used may be in any forms of solids, liquids and gases. Examples of the solid carriers include clay, talc, diatomaceous earth, bentonite, kaoline, acid clay and vermiculite; examples of the liquid carriers include water, alcohols, ketones, benzene, xylene, toluene, solvent naphtha, petroleum ether and deodorized kerosene; and examples of the gaseous carriers include Fureon gas, deodorized LPG, methyl chloride, vinyl chloride, dimethyl ether, nitrogen and carbon dioxide.

The thus formulated preparations can be applied, with or without dilution, by sprinkling, dusting, pouring or the like procedure. Further, the preparations can be broadened in application scope by using them in admixture with other chemicals such as, for example, Blasticidin-S, Kasugamycin, polyoxin, pentachlorobenzaldoxime, 2,3,4,5-tetrachlorophthalide, γ-1,2,3,4,5,6-hexachlorocyclohexane, N-(3,5-dichlorophenyl)maleimide, N-(3,5-dichlorophenyl)-succinimide, N-(3,5-dichlorophenyl)itaconimide, N-(trichloromethylthio)-4-cyclohexene-1,2-dicarboximide, N-(1,1,2,2-tetrachloroethylthio)-4-cyclohexene-1,2-dicarboximide, 3,4-dimethylphenyl-N-methyl carbamate, 1-(butylcarbamoyl)-2-benzimidazole carbamic acid methyl ester, zinc ethylenebis-dithiocarbamate, 1-naphthyl-N-methyl carbamate, 6-methyl-2,3-quinoxaline dithiol cyclic carbonate, O,O-diethyl-S-benzyl phosphorothioate, O-ethyl-S,S-diphenyl phosphorodithiolate, O-butyl-S-benzyl-S-ethyl phosphorodithiolate, O,O-dimethyl-O-(3-methyl-4-nitrophenyl) phosphorothioate, S-[1,2-bis(ethoxycarbonyl) ethyl]-0,0-dimethyl phosphorodithioate, O,O-dimethyl-S-(N-methyl carbamoyl-methyl) phosphorodithioate, O,O-diethyl-O-(2-isopropyl-6-methyl-4-pyrimidinyl) thiophosphate, ammonium iron methylarsonate and the like pyrethroid type insecticides, herbicides, nematocides, miticides and the like agricultural chemicals, and fertilizers, and synergistic effects due to mixing can be expected. In every case, however, no fungicidal effects of the individual chemicals are deteriorated. Actually, synergistic fungicidal effects were observed particularly when the present compounds were mixed with N-(3,5-dichlorophenyl)succinimide, O-n-butyl-S-ethyl-S-benzyl phosphorodithiolate, Kasugamycin and O,O-dimethyl-O-(3-methyl-4-nitrophenyl) phosphorothioate at ordinarily adopted concentrations.

Typical examples of the carbamic acid esters belonging to the present invention are enumerated below, but the scope of the present invention is not limited only to these.

Structural formula-1

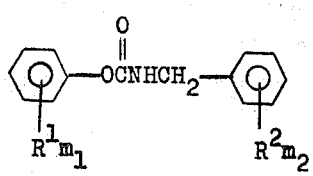

| Compound No. | $R^1m_1$ | $R^2m_2$ |
|---|---|---|
| (1) | 2—Cl | H |
| (2) | 2,4—Cl$_2$ | H |
| (3) | 2,4,6—Cl$_3$ | H |
| (4) | 2,4,5—Cl$_3$ | H |
| (5) | 2,2,5—Cl$_3$ | 4—Cl |
| (6) | 2,4,5—Cl$_3$ | 3,4—Cl$_2$ |
| (7) | 2,4,5—Cl$_3$ | 2,4,5—Cl$_3$ |
| (8) | 2,4,5—Cl$_3$ | 4—CH$_3$ |
| (9) | 3—CH$_3$, 4—Cl | H |
| (10) | 3,4—(CH$_3$)$_2$ | H |
| (11) | 2—NO$_2$ | H |
| (12) | 2—NO$_2$, 4—Cl | H |
| (13) | 2—NO$_2$, 4—CH$_3$ | H |
| (14) | 2—CH$_3$, 4—Cl, 5—NO$_2$ | H |
| (15) | 2,6—Cl$_2$, 4—NO$_2$ | H |
| (16) | 2,6—Br$_2$, 4—NO$_2$ | H |
| (17) | 2,4—(NO$_2$)$_2$ | H |
| (18) | 2—NO$_2$, 4—CH$_3$ | 4—OCH$_3$ |
| (19) | 2—NO$_2$, 4—CH$_3$ | 4—CH$_3$ |
| (20) | 2—NO$_2$, 4—CH$_3$ | 4—Cl |
| (21) | 2—NO$_2$, 4—Cl | 3,4—Cl$_2$ |
| (22) | 3—CN | H |
| (23) | 4—CN | H |
| (24) | 2—CN, 4—Cl | H |
| (25) | 2—OCH$_3$, 4—CN | H |
| (26) | 4—CN | 4—Cl |
| (27) | 4—CN | 4—OCH$_3$ |
| (28) | 4—CN | 4—CH$_3$ |
| (29) | 3—COOCH$_3$ | H |
| (30) | 4—COOC$_2$H$_5$ | H |
| (31) | 3—COCH$_3$ | H |
| (32) | 4—SCH$_3$ | H |
| (33) | 2—SCH$_3$, 4—Cl | H |
| (34) | 2,6—Cl$_2$, 4—SCH$_3$ | H |
| (35) | 3—CH$_3$, 4—SCH$_3$ | H |
| (36) | 4—SCH$_3$ | 4—Cl |
| (37) | 4—SCH$_3$ | 3,4—Cl$_2$ |
| (38) | 4—SCH$_3$ | 4—CH$_3$ |
| (39) | 4—SO$_2$CH$_3$ | H |
| (40) | 4—SO$_2$N(CH$_3$)$_2$ | H |
| (41) | 2—Cl, 4—SO$_2$N(C$_2$H$_5$)$_2$ | H |

Structural formula-2

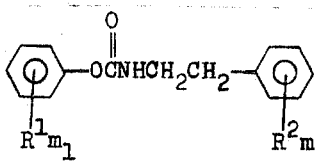

| Compound No. | $R^1m_1$ | $R^2m_2$ |
|---|---|---|
| (42) | 2—Cl | H |
| (43) | 2,4,6—Cl$_3$ | H |
| (44) | 2,4,5—Cl$_3$ | H |
| (45) | 2,4,5—Cl$_3$ | 4—Cl |
| (46) | 2,4,6—Cl$_3$ | 4—Cl |
| (47) | 2,4,5—Cl$_3$ | 3,4—Cl$_2$ |
| (48) | 2,4,5—Cl$_3$ | 4—CH$_3$ |
| (49) | 2,4,6—Cl$_3$ | 4—OCH$_3$ |
| (50) | 3—CH$_3$, 4—Cl | H |
| (51) | 3,4—(CH$_3$)$_2$ | H |
| (52) | 4—NO$_2$ | H |
| (53) | 2—Cl, 4—NO$_2$ | H |
| (54) | 2—NO$_2$, 4—Cl | H |
| (55) | 2,6—Cl$_2$, 4—NO$_2$ | H |
| (56) | 2—NO$_2$, 4—CH$_3$ | H |
| (57) | 2—CH$_3$, 4—Cl, 5—NO$_2$ | H |
| (58) | 2,6—Br$_2$, 4—NO$_2$ | H |
| (59) | 2,4—(NO$_2$)$_2$ | H |
| (60) | 2—NO$_2$, 4—Cl | 4—Cl |
| (61) | 2—NO$_2$, 4—Cl | 4—CH$_3$ |
| (62) | 2—NO$_2$, 4—CH$_3$ | 3,4—Cl$_2$ |
| (63) | 2—NO$_2$, 4—CH$_3$ | 4—OCH$_3$ |

Structural formula-3

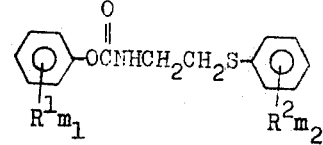

| Compound No. | $R^1m_1$ | $R^2m_2$ |
|---|---|---|
| (64) | 4—SCH$_3$ | H |
| (65) | 4—SCH$_3$ | 4—Cl |
| (66) | 4—SCH$_3$ | 4—CH$_3$ |
| (67) | 4—CN | H |
| (68) | 4—CN | 4—Cl |
| (69) | 4—CN | 4—OCH$_3$ |
| (70) | 4—CN | 4—CH$_3$ |
| (71) | 4—CHO | H |
| (72) | 4—SO$_2$N(C$_2$H$_5$)$_2$ | H |
| (73) | 4—SO$_2$N(C$_2$H$_5$)$_2$ | 3,4—Cl$_2$ |
| (74) | 3—CH$_3$, 4—SCH$_3$ | H |
| (75) | 3—CH$_3$, 4—SO$_2$N(C$_2$H$_5$)$_2$ | H |
| (76) | 2—OCH$_3$, 4—CN | H |
| (77) | 4—NO$_2$ | H |
| (78) | 4—NO$_2$ | 4—CH$_3$ |
| (79) | 4—NO$_2$ | 4—Cl |
| (80) | 2,4,6—Cl$_3$ | H |
| (81) | 2,4,6—Cl$_3$ | 4—Cl |
| (82) | 2—NO$_2$, 4—Cl | H |
| (83) | 2—NO$_2$, 4—Cl | 2—CH$_3$ |
| (84) | 2—NO$_2$, 4—CH$_3$ | 4—Cl |
| (85) | 2—NO$_2$, 4—CH$_3$ | 2—CH$_3$ |
| (86) | 2—NO$_2$, 4—CH$_3$ | 3—CH$_3$ |

Structural formula-4

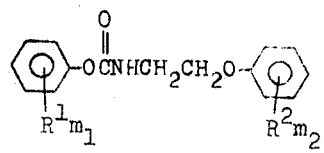

| Compound No. | $R^1m_1$ | $R^2m_2$ |
|---|---|---|
| (87) | 2—NO$_2$, 4—CH$_3$ | H |
| (88) | 2—NO$_2$, 4—CH$_3$ | 4—OCH$_3$ |
| (89) | 2—NO$_2$, 4—CH$_3$ | 2,4—Cl$_2$ |
| (90) | 2—NO$_2$, 4,6—Cl$_2$ | 2,4—Cl$_2$ |
| (91) | 2—NO$_2$, 4—Cl | 2,4—Cl$_2$ |
| (92) | 2—NO$_2$, 4—Cl | 4—CH$_3$ |
| (93) | 4—NO$_2$ | H |
| (94) | 4—NO$_2$ | 4—CH$_3$ |
| (95) | 4—NO$_2$ | 2,4—Cl$_2$ |
| (96) | 2,4,5—Cl$_3$ | 4—Cl |
| (97) | 2,4—Cl$_2$ | 3—CH$_3$ |
| (98) | 4—SCH$_3$ | H |
| (99) | 4—SCH$_3$ | 2,4—Cl$_2$ |
| (100) | 4—CHO | 4—Cl |
| (101) | 2—OCH$_3$, 4—CHO | 4—Cl |
| (102) | 4—CHO | 4—CH$_3$ |
| (103) | 4—NO$_2$ | 2,4—Cl$_2$ |
| (104) | 2—Cl, 4—SO$_2$N(C$_2$H$_5$)$_2$ | 4—Cl |
| (105) | 3—CH$_3$, 4—SO$_2$N(C$_2$H$_5$)$_2$ | 4—Cl |
| (106) | 4—COOC$_2$H$_5$ | 4—Cl |

Structural formula-5

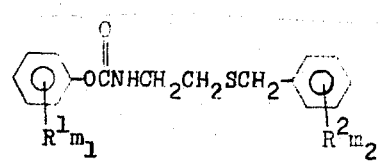

| Compound No. | $R^1m_1$ | $R^2m_2$ |
|---|---|---|
| (107) | 4—SCH$_3$ | H |
| (108) | 4—CN | H |
| (109) | 2—NO$_2$, 4—CH$_3$ | H |
| (110) | 2,4,6—Cl$_3$ | H |
| (111) | 2,4,6—Cl$_3$ | 4—Cl |

Structural formula-6

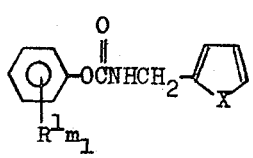

| Compound No. | $R^1m_1$ | X |
|---|---|---|
| (112) | 4—SCH$_3$ | O |
| (113) | 4—NO$_2$ | O |
| (114) | 4—CN | O |
| (115) | 2,4,6—Cl$_3$ | O |
| (116) | 2—NO$_2$, 4—CH$_3$ | O |
| (117) | 2,4,6—Cl$_3$ | S |

The present invention is illustrated in further detail below with reference to examples, but it is needless to say that the kinds of starting materials for the present compounds, the reaction conditions, and the kinds and mixing proportions of additives for the present compounds are variable within wide scopes without being limited to those mentioned in the examples.

EXAMPLE 1

Synthesis of the Compound (4)

Into a mixture comprising 19.7 g of 2,4,5-trichlorophenol, 200 ml of toluene and 14.8 g of phosgene was dropped at −5° to 5°C 8.2 g of a 50% caustic soda solution. Subsequently, the mixture was washed with 50 ml of water, and the organic layer was dried with anhydrous Glauber's salt. Into the mixture was dropped at −5° to 5°C a 50% toluene solution containing 22 g of benzylamine, followed by stirring at 30° to 40°C for 1 hour. Thereafter, 50 ml of water was added to the mixture to dissolve deposited amine hydrochloride, and the organic layer was washed 2 times with water, dried with anhydrous Glauber's salt and solvent was evaporated at reduced pressure, whereby 31 g of a yellow crystal was obtained. This crystal was recrystallized from a solvent comprising a 1:1 mixture of n-hexane and benzene to obtain 23 g of a white crystal, m.p. 128°–130°C.

Elementary analysis:

| | C (%) | H (%) | N (%) | Cl (%) |
|---|---|---|---|---|
| Calculated (for C$_{14}$H$_{10}$Cl$_3$NO$_2$) | 50.83 | 3.03 | 4.24 | 32.22 |
| Found | 50.44 | 2.96 | 4.17 | 33.01 |

Table 1

Next compounds as listed in the following Table 1 were synthesized in the similar manner as in Example 1. The products are represented by the Compound No. as mentioned below.

| Example No. | Starting materials | | Products (Comp. No.) | Yield % (after recrystallization) | Phys. property |
|---|---|---|---|---|---|
| 2 | 2,4,5-Trichlorophenol<br>Phosgene<br>50% Caustic soda sol.<br>β-Phenethylamine<br>Triethylamine | 19.7 g<br>14.8 g<br>8.2 g<br>13.3 g<br>10.1 g | (44) | 65 | m.p. 93° – 95°C |
| 3 | 2-Nitrophenol<br>Phosgene<br>50% Caustic soda sol.<br>Benzylamine<br>Triethylamine | 13.9 g<br>14.8 g<br>8.2 g<br>15.0 g<br>10.1 g | (11) | 58 | m.p. 81° – 83°C |
| 4 | 2-Nitro-4-chlorophenol<br>Phosgene<br>50% Caustic soda sol.<br>Benzylamine | 20.8 g<br>14.8 g<br>8.2 g<br>30.0 g | (12) | 69 | m.p.<br>124.5° – 126.5°C |
| 5 | p-Nitrophenol<br>Phosgene<br>50% Caustic soda sol.<br>β-Phenethylamine<br>Triethylamine | 13.9 g<br>14.8 g<br>8.2 g<br>13.3 g<br>10.1 g | (52) | 70 | m.p.<br>110° – 111°C |
| 6 | 2-Nitro-4-chlorophenol<br>Phosgene<br>50% Caustic soda sol.<br>β-Phenethylamine<br>Triethylamine | 20.8 g<br>14.8 g<br>8.2 g<br>13.3 g<br>10.1 g | (54) | 65 | m.p.<br>82.5° – 84°C |
| 7 | m-Cyanophenol<br>Phosgene<br>50% Caustic soda sol.<br>Benzylamine<br>Triethylamine | 11.9 g<br>14.8 g<br>8.2 g<br>15.0 g<br>10.1 g | (22) | 55 | m.p. 91° – 93°C |
| 8 | (*m-Cyanophenol<br>p-Cyanophenol<br>Phosgene<br>Pyridine<br>Benzylamine | 11.9 g)<br>11.9 g<br>14.8 g<br>7.9 g<br>30.0 g | (*(22))<br>(23) | 58 | (m.p. 91° – 93°C)<br>m.p.<br>147° – 148°C |
| 9 | 4-(Methylthio)phenol<br>Phosgene<br>Pyridine<br>β-Phenylthioethylamine<br>Triethylamine | 14.0 g<br>14.8 g<br>7.9 g<br>15.3 g<br>10.5 g | (64) | 60 | m.p.<br>67° – 68.5°C |
| 10 | p-Nitrophenol<br>Phosgene<br>50% Caustic soda sol.<br>β-(4-Methyl)phenethylamine<br>Triethylamine | 20.1 g<br>14.8 g<br>8.2 g<br>18.3 g<br>10.1 g | (66) | 65 | m.p. 96° – 98°C |

Table 1 — Continued

Next compounds as listed in the following Table 1 were synthesized in the similar manner as in Example 1. The products are represented by the Compound No. as mentioned below.

| Example No. | Starting materials | | Products (Comp. No.) | Yield % (after recrystallization) | Phys. property |
|---|---|---|---|---|---|
| 11 | 2-Nitro-4-chlorophenol<br>Phosgene<br>50% Caustic soda sol.<br>β-(2-Methyl)phenethylamine<br>Triethylamine | 20.8 g<br>14.8 g<br>8.2 g<br>18.3 g<br>10.1 g | (83) | 55 | m.p.<br>92.5° – 94.5°C |
| 12 | 2-Nitro-4-methylphenol<br>Phosgene<br>Triethylamine<br>β-(2,4-Dichlorophenoxy)-<br>ethylamine<br>Triethylamine | 15.3 g<br>14.8 g<br>10.1 g<br>20.6 g<br>10.5 g | (89) | 58 | m.p.<br>104° – 107°C |
| 13 | 2,4,5-Trichlorophenol<br>Phosgene<br>Pyridine<br>β-(p-Chlorophenoxy)-<br>ethylamine<br>Triethylamine | 19.7 g<br>14.8 g<br>7.9 g<br>19.0 g<br>10.1 g | (96) | 64 | m.p.<br>113° – 115°C |
| 14 | 4-(Methylthio)phenol<br>Phosgene<br>Pyridine<br>β-Phenoxyethylamine<br>Triethylamine | 14.0 g<br>14.8 g<br>7.9 g<br>13.7 g<br>10.5 g | (98) | 60 | m.p.<br>87.5°–88.5°C |
| 15 | 2,4,6-Trichlorophenol<br>Phosgene<br>β-Benzylthioethylamine<br>Triethylamine | 19.7 g<br>14.8 g<br>17.0 g<br>10.5 g | (110) | 43 | m.p. 97°– 98°C |

EXAMPLE 16

Synthesis of the Compound (8)

To a solution of 19.7 g of 2,4,5-trichlorophenol in 200 ml of toluene was added 0.5 g of triethylamine. The resulting mixture was charged with 14.7 g of p-methylbenzyl isocyanate and then stirred at 30° to 40°C for 24 hours. Subsequently, the solvent was removed by distillation, whereby 33.4 g of a pale yellow crystal was obtained. This crystal was recrystallized from a solvent comprising a 1:1 mixture of n-hexane and benzene to obtain 25 g of a white crystal, m.p. 121°–122.5°C.

Elementary analysis:

| | C (%) | H (%) | N (%) | Cl (%) |
|---|---|---|---|---|
| Calculated<br>(for $C_{15}H_{12}Cl_3NO_2$) | 52.25 | 3.48 | 4.06 | 30.91 |
| Found | 52.15 | 3.39 | 4.10 | 30.96 |

The following compounds as shown in the Table 2 were synthesized in the similar manner as in Example 16.

Table 2

| Example No. | Starting materials | | Products (Comp. No.) | Yield % (after recrystallization) | Phys. property |
|---|---|---|---|---|---|
| 17 | 2,4,5-Trichlorophenol<br>Triethylamine<br>β-(p-Chloro)phenethyl-<br>isocyanate | 19.7 g<br>0.5 g<br>21.0 g | (45) | 75 | m.p.<br>107.5° – 109°C |
| 18 | 2-Methyl-4-chloro-5-<br>nitrophenol<br>Triethylamine<br>Benzylisocyanate | 18.7 g<br>0.5 g<br>15.0 g | (14) | 63 | m.p.<br>115.5° – 117.5°C |
| 19 | 2,6-Dichloro-4-nitro-<br>phenol<br>Triethylamine<br>β-Phenethylisocyanate | 20.8 g<br>0.5 g<br>17.5 g | (55) | 54 | m.p.<br>80° – 84°C |
| 20 | 2-Methyl-4-chloro-5-<br>nitrophenol<br>Triethylamine<br>β-Phenethylisocyanate | 18.7 g<br>0.5 g<br>17.5 g | (57) | 72 | m.p.<br>134° – 135°C |
| 21 | 2-Methoxy-4-cyanophenol<br>Triethylamine<br>Benzylisocyanate | 14.9 g<br>0.5 g<br>15.0 g | (25) | 70 | m.p.<br>153° – 154.5°C |
| 22 | p-(Methylthio)phenol<br>Triethylamine<br>Benzylisocyanate | 14.0 g<br>0.5 g<br>15.0 g | (32) | 65 | m.p.<br>79° – 80°C |
| 23 | 2-Chloro-4-N,N-diethyl-<br>sulfamoylphenol<br>Triethylamine<br>Benzylisocyanate | 26.0 g<br>0.5 g<br>15.0 g | (41) | 62 | m.p.<br>103° – 105°C |
| | p-(Methylthio)phenol<br>Triethylamine | 14.0 g<br>0.5 g | (65) | 78 | m.p. |

Table 2 — Continued

| Example No. | | | Products (Comp. No.) | Yield % (after recrystallization) | Phys. property | | |
|---|---|---|---|---|---|---|---|
| 24 | β-(4-Chloro)phenylthioethyl)-isocyanate | 23.4 g | | | 91° | – | 92°C |
| 25 | p-Cyanophenol<br>Triethylamine<br>β-Phenylthioethyl-isocyanate | 11.9 g<br>0.5 g<br>18.5 g | (67) | 73 | m.p.<br>86° | – | 87.5°C |
| 26 | 2,4,6-Trichlorophenol<br>Triethylamine<br>4-Chlorophenylthio-ethylisocyanate | 19.7 g<br>0.5 g<br>24.0 g | (81) | 54 | m.p.<br>93.5° | – | 94.5°C |
| 27 | 2-Nitro-4-chlorophenol<br>Phenylthioethylisocyanate<br>Triethylamine | 17.3 g<br>19.7 g<br>0.5 g | (82) | 62 | m.p.<br>69.5° | – | 71.0°C |
| 28 | 2-Nitro-4-methylphenol<br>Trimethylamine<br>β-(p-Methoxy)phenoxyethyl-isocyanate | 13.7 g<br>0.5 g<br>19.3 g | (88) | 78 | m.p.<br>98° | – | 99.5°C |
| 29 | 4-Nitrophenol<br>Triethylamine<br>2,4-Dichlorophenoxyethyl-isocyanate | 14.0 g<br>0.5 g<br>18.0 g | (95) | 65 | m.p.<br>122.5° | – | 125°C |
| 30 | 4-(Methylthio)phenol<br>Triethylamine<br>2,4-Dichlorophenoxyethyl-isocyanate | 14.0 g<br>0.5 g<br>23.2 g | (99) | 58 | m.p.<br>75.5° | – | 78.5°C |
| 31 | 2-Nitro-4-methylphenol<br>Triethylamine<br>β-Benzylthioethyl-isocyanate | 13.7 g<br>0.5 g<br>22.0 g | (109) | 58 | m.p.<br>58° | – | 59°C |
| 32 | 2,4,6-Trichlorophenol<br>Triethylamine<br>Furfurylisocyanate | 19.7 g<br>0.5 g<br>15.0 g | (115) | 52 | m.p.<br>112° | – | 113°C |
| 33 | 2,4,6-Trichlorophenol<br>Triethylamine<br>Thenylisocyanate | 19.7 g<br>0.5 g<br>20.0 g | (117) | 48 | m.p.<br>123° | – | 125°C |

EXAMPLE 34

Synthesis of the Compound (68)

To a solution of 11.9 g of 4-cyanophenol in 200 ml of pyridine was added at 40° to 50°C 27.5 g of N-(4-chlorophenylthioethyl)carbamyl chloride, and the resulting mixture was stirred at said temperature for 24 hours. The mixture was charged with 200 ml of benzene and further with dilute hydrochloric acid to transfer pyridine salt to the aqueous layer. The benzene layer was washed several times with dilute hydrochloric acid and then dried over anhydrous Glauber's salt. Subsequently, the benzene was removed by distillation, whereby 28.5 g of a white crystal was obtained. This crystal was recrystallized 2 times from a solvent comprising a 1:1 mixture of n-hexane and benzene to obtain 15.1 g of a white crystal, m.p. 112°–114°C.

Elementary analysis:

| | C (%) | H (%) | Cl (%) | N (%) | S (%) |
|---|---|---|---|---|---|
| Calculated for $C_{16}H_{13}ClN_2O_2S$ | 57.74 | 3.94 | 10.65 | 8.42 | 9.63 |
| Found | 57.72 | 4.00 | 10.53 | 8.48 | 9.69 |

The following compounds as shown in the Table 3 were synthesized in the similar manner as in Example 34.

Table 3

| Example No. | | | Products (Comp. No.) | yield % (after recrystallization) | Phys. property | | |
|---|---|---|---|---|---|---|---|
| 35 | N-(4-Chlorophenylthio-ethyl)carbamylchloride<br>4-Nitrophenol | 25.0 g<br>13.9 g | (79) | 63 | m.p.<br>130° | – | 132°C |
| 36 | 2-Nitro-4-methylphenol<br>N-(4-Chlorophenylthio-ethyl)carbamylchloride | 13.7 g<br>27.5 g | (84) | 59 | m.p.<br>74.5° | – | 75.5°C |
| 37 | 2-Nitro-4-chlorophenol<br>N-(2,4-Dichlorophenoxy-ethyl)carbamylchloride | 17.3 g<br>26.8 g | (91) | 70 | m.p.<br>118.5° | – | 120°C |
| 38 | p-Formylphenol<br>N-(4-Chlorophenoxyethyl)-carbamylchloride | 12.2 g<br>25.7 g | (100) | 50 | m.p.<br>104° | – | 107°C |

EXAMPLE 39

Synthesis of the Compound (70)

To a solution of 18.8 g of 4-cyanophenyl-N,N-ethylene carbamate in 200 ml of benzene was added 13.6 g of 4-methylthiophenol, and the resulting mixture was stirred at 20° to 30°C for 24 hours. Subsequently, the solvent was removed by distillation, whereby 21.7 g of a pale yellow crystal was obtained. This crystal was recrystallized from a solvent comprising a 1:1 mixture of n-hexane and benzene to obtain 15.2 g of a white crystal, m.p. 73.5°–75.5°C.

Elementary analysis:

|  | C (%) | H (%) | N (%) | S (%) |
|---|---|---|---|---|
| Calculated (for $C_{17}H_{16}O_2N_2S$) | 65.36 | 5.16 | 8.97 | 10.26 |
| Found | 65.32 | 5.20 | 8.98 | 10.16 |

The following compounds as shown in the Table 4 were synthesized in the similar manner as in Example 39.

Table 4

| Example No. | Starting materials | | Products (Comp. No.) | Yield % (after recrystallization) | Phys. property |
|---|---|---|---|---|---|
| 40 | 2-(Methylthio)phenol<br>2-Nitro-4-methylphenyl-N,N-ethylenecarbamate | 14.8 g<br>22.2 g | (85) | 52 | m.p. 84° – 85°C |
| 41 | p-Ethoxycarbonylphenyl-N,N-ethylenecarbamate<br>p-Chlorophenol | 23.5 g<br>15.0 g | (106) | 63 | m.p. 98° – 98.5°C |

EXAMPLE 42

Dust

2 Parts of the compound (4) and 98 parts of clay were sufficiently pulverized and mixed together to obtain a dust containing 2% of active ingredient. In application, the dust was dusted as it was.

Compound (14), (45), (12), (54), (23), (81), (64), (82), (87), (99), (100), (110) were formulated in the similar manner as in Example 42.

EXAMPLE 43

Wettable Powder

50 Parts of the compound (1), 5 parts of a wetting agent of the alkylbenzenesulfonate type and 45 parts of diatomaceous earth were sufficiently pulverized and mixed together to obtain a wettable powder containing 50% of active ingredient. In application, the wettable powder was diluted with water, and the resulting solution was sprayed.

Compound (43), (13), (53), (32), (77), (67), (83), (88), (94), (105), (108) were formulated in the similar manner as in Example 43.

EXAMPLE 44

Emulsifiable Concentrate

10 Parts of the compound (10), 80 parts of dimethyl sulfoxide and 10 parts of an emulsifier of the polyoxyethylene phenylphenol polymer type were mixed together to obtain an emulsifiable concentrate containing 10% of active ingredient. In application, the emulsifiable concentrate was diluted with water, and the resulting emulsion was sprayed.

Compound (52), (19), (57), (26), (66), (79), (84), (89), (95), (106), (109) were formulated in the similar manner as in Example 44.

EXAMPLE 45

Granule

5 Parts of the compound (8), 90 parts of silica powder, 4.95 parts of calcium lignin sulfonate and 0.05 part of sodium alkylbenzenesulfonate were sufficiently pulverized and mixed together, and the resulting mixture was kneaded with water, granulated by means of a granulator and then dried to obtain a granule containing 5% of active ingredient. In application, the granule was charged as it was into water or soil or sprinkled over the surface of water or soil.

Compound (50), (15), (58), (40), (69), (78), (83), (91), (97), (101), (107) were formulated in the similar manner as in Example 45.

EXAMPLE 46

Composite Dust

2 Parts of the compound (4), 2 parts of N-(3,5-dichlorophenyl)succinimide and 96 parts of clay were sufficiently pulverized and mixed together to obtain a composite dust containing 4% of active ingredient. In application, the dust was dusted as it was.

Compound (46), (14), (60), (61), (25), (45), (74), (80), (92), (99), (93), were formulated in the similar manner as in Example 46.

EXAMPLE 47

Composite Dust

1 Part of the compound (4), 1 part of O-n-butyl-S-benzyl-S-ethyl phosphorodithiolate and 98 parts of talc were sufficiently pulverized and mixed together to obtain a composite dust containing 2% of active ingredient.

Compound (46), (20), (5), (45), (32), (72), (77), (86), (92), (94), (99) were formulated in the similar manner as in Example 47.

EXAMPLE 48

Composite Dust

2 Parts of the compound (4), 2 parts of O,O-dimethyl-O-(3-methyl-4-nitrophenyl)phosphorothioate, 0.1 part of Kasugamycin and 95.9 parts of clay were sufficiently pulverized and mixed together to obtain a composite dust containing 4.1% of active ingredient.

Compound (46), (55), (12), (56), (41), (70), (45), (78), (82), (91), (97) were formulated in the similar manner as in Example 48.

EXAMPLE 49

Dusts A, B and C:

2 Parts of the compound (94) and 98 parts of clay were sufficiently pulverized and mixed together to obtain a dust A containing 2% of active ingredient.

In the same manner as above, dusts B and C containing individually 2% of the compounds (1) and (2) as active ingredients were obtained.

In application, each dust was dusted as it was.

EXAMPLE 50

Composite Wettable Powder

30 Parts of the compound (103), 10 parts of pentachloronitrobenzene, 10 parts of (N-1,1,2,2-tetrachloroethylthio)-4-cyclohexene-1,2-dicarboximide, 45 parts of diatomaceous earth and 5 parts of a wetting agent of the alkylbenzenesulfonate type were sufficiently pulverized and mixed together to obtain a composite wettable powder containing 50% of active ingredient. In application, the wettable powder was diluted with water, and the resulting solution was sprayed.

EXAMPLE 51

Composite Wettable Powder

30 Parts of the compound (106), 10 parts of 1-(N-n-butyl carbamoyl)-2-methoxycarbonylaminobenzimidazole, 10 parts of 6-methyl-2,3-quinoxalinedithiol cyclic-S,S-dithiocarbonate, 5 parts of a wetting agent of the alkylbenzenesulfonate type and 45 parts of diatomaceous earth were sufficiently pulverized and mixed together to obtain a composite wettable powder containing 50% of active ingredient. In application, the wettable powder was diluted with water, and the resulting solution was sprayed.

EXAMPLE 52

Composite Dust:

2 Parts of the compound (99), 1 part of zinc ethylenebis(dithiocarbamate), 0.2 part of polyoxin PS and 96.8 parts of clay were sufficiently pulverized and mixed together to obtain a composite dust containing 3.2% of active ingredient.

In order to substantiate the fact that the present compounds have such strong and broad fungicidal effects as not seen in the conventional fugicides, typical test results are shown in the following test examples:

TEST EXAMPLE 1

Rice seedlings (variety "Waseasahi"), which had been cultivated to the 3-leaves stage in flower pots of 9 cm in diameter, were sprayed with 7 ml per pot of each of aqueous solutions of test compounds in the form of wettable powders. After 1 day, the rice seedlings were sprayed and inoculated with a spore suspension of rice blast fungus (*Pyricularia oryzae*) and, 4 days thereafter, the number of spots generated was counted to investigate the fungicidal effects of the individual compounds. The results obtained were as shown in Table 5. As seen in Table 5, the present compounds showed markedly prominent effects as compared with the control known homologous compounds. In Table 5, the present compounds are represented by the numbers of the previously exemplified compounds; the same shall apply hereinafter.

Table 5

| Compound No. | concentration (p.p.m.) | Active ingredient of spots per leaf | Number |
|---|---|---|---|
| (1) | | 500 | 9.8 |
| (2) | 500 | 8.6 | |
| (3) | 500 | 8.8 | |
| (4) | 500 | 0 | |
| (5) | 500 | 0.2 | |
| (6) | 500 | 1.3 | |
| (7) | 500 | 0.9 | |
| (8) | 500 | 1.0 | |
| (9) | 500 | 2.6 | |
| (10) | 500 | 0.7 | |
| (11) | 500 | 10.0 | |
| (12) | 500 | 5.2 | |
| (13) | 500 | 3.1 | |
| (14) | 500 | 4.5 | |
| (15) | 500 | 6.2 | |
| (16) | 500 | 6.6 | |
| (17) | 500 | 8.3 | |
| (18) | 500 | 4.5 | |
| (19) | 500 | 1.1 | |
| (20) | 500 | 0.9 | |
| (21) | 500 | 2.2 | |
| (22) | 500 | 1.9 | |
| (23) | 500 | 1.1 | |
| (24) | 500 | 3.5 | |
| (25) | 500 | 2.7 | |
| (26) | 500 | 1.5 | |
| (27) | 500 | 5.3 | |
| (28) | 500 | 6.2 | |
| (29) | 500 | 10.3 | |
| (30) | 500 | 11.2 | |
| (31) | 500 | 12.7 | |
| (32) | 500 | 4.1 | |
| (33) | 500 | 8.3 | |
| (34) | 500 | 1.1 | |
| (35) | 500 | 3.5 | |
| (36) | 500 | 1.0 | |
| (37) | 500 | 0.9 | |
| (38) | 500 | 5.1 | |
| (39) | 500 | 11.5 | |
| (40) | 500 | 8.8 | |
| (41) | 500 | 7.4 | |
| (42) | 500 | 7.2 | |
| (43) | 500 | 0.4 | |
| (44) | 500 | 1.2 | |
| (45) | 500 | 7.1 | |
| (46) | 500 | 3.6 | |
| (47) | 500 | 0.3 | |
| (48) | 500 | 4.9 | |
| (49) | 500 | 8.7 | |
| (50) | 500 | 14.6 | |
| (51) | 500 | 11.2 | |
| (52) | 500 | 5.3 | |
| (53) | 500 | 1.1 | |
| (54) | 500 | 0.9 | |
| (55) | 500 | 3.3 | |
| (56) | 500 | 0.7 | |
| (57) | 500 | 1.8 | |
| (58) | 500 | 2.0 | |
| (59) | 500 | 4.1 | |
| (60) | 500 | 4.9 | |
| (61) | 500 | 2.3 | |
| (62) | 500 | 1.5 | |
| (63) | 500 | 6.3 | |
| (64) | 500 | 0 | |
| (65) | 500 | 0.5 | |
| (66) | 500 | 1.3 | |
| (67) | 500 | 4.8 | |
| (68) | 500 | 3.2 | |
| (69) | 500 | 5.6 | |
| (70) | 500 | 4.8 | |
| (71) | 500 | 9.6 | |
| (72) | 500 | 0 | |
| (73) | 500 | 2.3 | |
| (74) | 500 | 0.8 | |
| (75) | 500 | 2.1 | |
| (76) | 500 | 5.6 | |
| (77) | 500 | 0 | |
| (78) | 500 | 0.4 | |
| (79) | 500 | 0 | |
| (80) | 500 | 0 | |
| (81) | 500 | 0 | |
| (82) | 500 | 2.5 | |
| (83) | 500 | 1.8 | |
| (84) | 500 | 4.5 | |
| (85) | 500 | 3.7 | |
| (86) | 500 | 1.3 | |

Table 5-Continued

| Compound No. | concentration (p.p.m.) | Active ingredient Number of spots per leaf |
|---|---|---|
| (87) | 500 | 3.0 |
| (88) | 500 | 1.8 |
| (89) | 500 | 3.2 |
| (90) | 500 | 2.6 |
| (91) | 500 | 1.5 |
| (92) | 500 | 4.6 |
| (93) | 500 | 10.3 |
| (94) | 500 | 12.5 |
| (95) | 500 | 20.3 |
| (96) | 500 | 9.8 |
| (97) | 500 | 18.4 |
| (98) | 500 | 0.5 |
| (99) | 500 | 0.5 |
| (100) | 500 | 2.0 |
| (101) | 500 | 3.5 |
| (102) | 500 | 1.8 |
| (103) | 500 | 5.0 |
| (104) | 500 | 8.3 |
| (105) | 500 | 7.9 |
| (106) | 500 | 2.0 |
| (107) | 500 | 1.5 |
| (108) | 500 | 3.2 |
| (109) | 500 | 5.6 |
| (110) | 500 | 8.7 |
| (111) | 500 | 11.0 |
| N-3-Chlorophenyl* 2',4',5'-trichlorophenylcarbamate (Disclosed in Japanese Patent Publication No. 8031/68) | 500 | 33.2 |
| N-Phenyl 2,4,6-trichloro* phenylcarbamate (Disclosed in Japanese Patent Publication No. 8031/68) | 500 | 38.4 |
| N-(p-Chlorobenzyl)-methylcarbamate* (Disclosed in Japanese Patent Publication No. 4422/69) | 500 | 35.6 |
| Non-spraying | — | 65.7 |

*Control

TEST EXAMPLE 2

Rice seedlings (variety "Waseasahi") were grown to the 3- to 4-leaves stage in a rice nursery divided into sections of 1 m² in area. At this stage, the rice seedlings were dusted with 3 kg. per 10 ares of each of test chemicals in the form of dusts. After 1 day, the seedlings were sprayed and inoculated with a spore suspension of rice blast fungus (*Pyricularia oryzae*) and, 10 days thereafter, the number of spots generated was counted to investigate the fungicidal effects of the individual chemicals. The results obtained were as shown in Table 6. As seen in Table 6 the dusts of the present invention were more excellent in fungicidal effect than the commercially available fungicide.

Table 6

| Chemical | Active ingredient concentration (%) | Number of spots per leaf |
|---|---|---|
| Dust of Example 42 (Compound No.(45)) | 2.0 (2.0) | 6.9 |
| Composite dust of Example 46 (Compound No.(45)) | 4.0 (2.0) | 0.3 |
| Composite dust of Example 47 (Compound No.(45)) | 2.0 (1.0) | 0.3 |
| Composite dust of Example 48 (Compound No.(45)) | 4.1 (2.0) | 0.4 |
| Dust of Example 42 (Compound No.(12)) | 2.0 (2.0) | 3.7 |
| Composite dust of Example 46 (Compound No.(14)) | 4.0 (2.0) | 2.8 |
| Composite dust of Example 47 (Compound No.(20)) | 2.0 (1.0) | 0.5 |
| Composite dust of Example 48 (Compound No.(12)) | 4.1 (2.0) | 1.9 |
| Dust of Example 42 (Compound No.(54)) | 2.0 (2.0) | 5.4 |
| Composite dust of Example 46 (Compound No.(60)) | 4.0 (2.0) | 0.9 |
| Composite dust of Example 47 (Compound No.(5)) | 2.0 (1.0) | 3.7 |
| Composite dust of Example 48 (Compound No. (55)) | 4.1 (2.0) | 1.2 |
| Dust of Example 42 (Compound No. (23)) | 2.0 (2.0) | 1.5 |
| Composite dust of Example 46 (Compound No. (25)) | 4.0 (2.0) | 0.8 |
| Composite dust of Example 47 (Compound No.(32)) | 2.0 (1.0) | 0.5 |
| Composite dust of Example 48 (Compound No.(41)) | 4.1 (2.0) | 0.9 |
| Dust of Example 42 (Compound No.(81)) | 2.0 (2.0) | 6.7 |
| Composite dust of Example 46 (Compound No.(80)) | 4.0 (2.0) | 1.4 |
| Composite dust of Example 47 (Compound No.(77)) | 2.0 (1.0) | 0.3 |
| Composite dust of Example 48 (Compound No.(78)) | 4.1 (2.0) | 0.8 |
| Dust of Example 42 (Compound No.(99)) | 2.0 (2.0) | 9.6 |
| Dust of Example 42 (Compound No.(100)) | 3.0 (3.0) | 9.4 |
| Composite dust of Example 46 (Compound No.(99)) | 4.0 (2.0) | 0.5 |
| Composite dust of Example 52 (Compound No.(99)) | 3.2 (2.0) | 1.4 |
| Dust of Example 49 Dust A (Compound No.(94)) | 2.0 | 12.3 |
| Dust B (Compound No.(94.1)) | 2.0 | 11.9 |
| Dust C (Compound No.(94.2)) | 2.0 | 18.7 |
| Composite dust of Example 46 (Compound No.(93)) | 4.0 (2.0) | 1.2 |
| Composite dust of Example 47 (Compound No.(94)) | 2.0 (1.0) | 0.4 |
| Composite dust of Example 48 (Compound No.(97)) | 4.1 (2.0) | 0.9 |
| N-3,5-Dichlorophenyl succinimide* | 2.0 | 25.3 |
| O-n-Butyl-S-ethyl-S-benzyl phosphorodithiolate* | 1.0 | 7.1 |
| Kasugamycin (commercially available fungicide)* | 0.1 | 8.9 |
| O,O-Dimethyl-O-(3-methyl-4-nitrophenyl)phosphorothioate* | 3 2.0 | 70.3 |
| Non-dusting | — | 65.1 |

*Control (the other component of the composite dust)
Note: The parenthesized numeral in the column "Active ingredient concentration" is the content of the present compound.

TEST EXAMPLE 3

Rice Blast-Controlling Effects

Rice seedlings (variety "Waseasahi") were grown to the 3- to 4-leaves stage in a rice nursery divided into sections of 1 m² in area. At this stage, the seedlings were dusted with 3 kg per 10 ares of each of test compounds in the form of dusts. After 1 day, the seedlings were sprayed and inoculated with a spore suspension of rice blast fungus (*Pyricularia oryzae*) and, 10 days thereafter, the number of spots generated was counted to investigate the controlling effects of the individual compounds. The results obtained were as shown in Table 7. As seen in Table 7, the compounds of the present invention were more excellent in fungicidal effect than the control known homologous compound, and the composite dusts displayed markedly prominent effects.

Table 7

| Compound | Active ingredient concentration (%) | Number of spots per leaf |
|---|---|---|
| (64) | 3.0 | 3.8 |
| (66) | 3.0 | 18.9 |
| (69) | 3.0 | 25.3 |
| (73) | 3.0 | 6.8 |
| (82) | 3.0 | 9.5 |
| (83) | 3.0 | 6.4 |
| (84) | 3.0 | 10.8 |
| (85) | 3.0 | 7.7 |
| (86) | 3.0 | 12.3 |
| (87) | 3.0 | 10.5 |
| (88) | 3.0 | 7.3 |
| (89) | 3.0 | 15.6 |
| (90) | 3.0 | 8.8 |
| (91) | 3.0 | 11.3 |
| (92) | 3.0 | 14.7 |
| N-(p-Chlorobenzyl)-methylcarbamate * (Disclosed in Japanese Pat. Publication) No. 4422/69) | 3.0 | 80.7 |
| Non-dusting | — | 85.9 |

* Control

TEST EXAMPLE 4
Rice Helminthosporium Leaf Spot-Controlling Effects

Rice seedling (variety "Waseasahi"), which had been cultivated to the 4-leaves stage in flower pots of 9 cm in diameter, were dusted by use of a bell jar duster with 100 mg per pot of each of test compounds in the form of dusts. After 1 day, the seedlings were sprayed and inoculated with a spore suspension of rice helminthosporium leaf spot fungus (Cochliobolus miyabeanus) and, 3 days thereafter, the number of spots generated was counted to investigate the fungicidal effects of the individual compound. The results obtained were as shown in Table 8. As seen in Table 8, the present compounds displayed markedly excellent controlling effects as compared with the control known homologous compound.

Table 8

| Compound | Active ingredient concentration (%) | Number of spots per leaf |
|---|---|---|
| (64) | 4.0 | 12.5 |
| (75) | 4.0 | 14.8 |
| (82) | 4.0 | 11.3 |
| (83) | 4.0 | 16.7 |
| (84) | 4.0 | 15.2 |
| (85) | 4.0 | 9.8 |
| (86) | 4.0 | 15.6 |
| (87) | 4.0 | 15.9 |
| (88) | 4.0 | 10.3 |
| (89) | 4.0 | 16.4 |
| (90) | 4.0 | 9.7 |
| (91) | 4.0 | 11.2 |
| (92) | 4.0 | 18.5 |
| (98) | 4.0 | 15.9 |
| (99) | 4.0 | 12.5 |
| (100) | 4.0 | 13.8 |
| (103) | 4.0 | 20.9 |
| (106) | 4.0 | 24.0 |
| Kasugamycin * | 0.2 | 97.8 |
| O-n-Butyl-S-ethyl-S-benzyl phosphorodithiolate * | 4.0 | 18.6 |
| Non-dusting | — | 96.7 |

* Control

TEST EXAMPLE 5

Cucumber Damping Off Fungus-Controlling Effects

Farm soil was packed in flower pots of 9 cm in diameter. Over the surface of said soil was uniformly spread each 10 ml of pathogenic soil, in which had been cultured and propagated damping off fungus (Pellicularia filamentoza). Into the soil was then charged 15 ml per pot of each of aqueous 500 p.p.m. emulsions of test compounds in the form of emulsifiable concentrates. After 2 hours, 10 seeds of cucumber (variety "Kairyoaodaicho") were sowed in the soil and, 5 days thereafter, the damaged state of cucumber seedlings was investigated. The results obtained were as shown in Table 9. As seen in Table 9, the present compounds displayed markedly excellent effects.

The ratio of non-damaged seedlings was calculated according to the following equation:

$$\text{Ratio of non-damaged seedlings} = \frac{\text{Number of non-damaged seedlings in treated area}}{\text{Number of germinated seedlings in non-treated and non-inoculated area}} \times 100$$

Table 9

| Compound | Active ingredient concentration (p.p.m.) | Ratio of non-damaged seedling | Phytotoxicity |
|---|---|---|---|
| (64) | 500 | 80.0 | — |
| (68) | 500 | 98.2 | — |
| (73) | 500 | 90.4 | — |
| (77) | 500 | 75.6 | — |
| (78) | 500 | 68.4 | — |
| (79) | 500 | 72.3 | — |
| (80) | 500 | 80.1 | — |
| (81) | 500 | 78.2 | — |
| (88) | 500 | 85.9 | — |
| (89) | 500 | 90.3 | — |
| (90) | 500 | 40.5 | — |
| (98) | 500 | 83.4 | — |
| (103) | 500 | 78.4 | — |
| (103) | 300 | 32.4 | — |
| N-Phenethynyl carbamic acid p-thiacyanophenyl ester * (Disclosed in French Patent 1,543,418) | 500 | 18.4 | |
| Composite wettable powder of Example 117 | 500 (300) | 100 | |
| N-(1,1,2,2-Tetrachloroethylthio)-4-cyclohexene-1,2-dicarboximide * (Commercially available fungicide) | 500 | 59.4 | |
| Pentachloronitrobenzene * (Commercially available fungicide) | 500 | 92.2 | |
| Non-treatment, fungus inoculated | — | 0 | |
| Non-treatment, fungus not inoculated | — | 100 | |

* Control

Note: The parenthesized numeral is the content of the present compound.

What is claimed:
1. A carbamic acid ester having the formula,

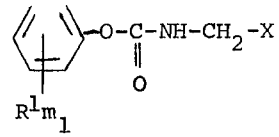

wherein

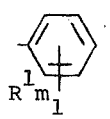

is selected from the group consisting of

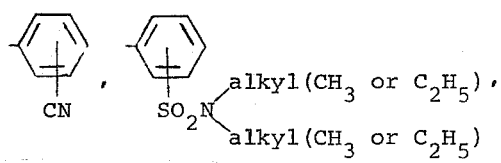

2-cyano-4-chlorophenyl and 2-methoxy-4-cyanophenyl and X is a group of the formula,

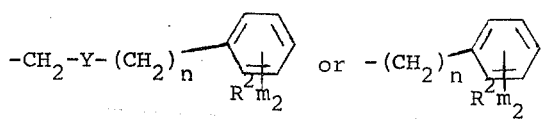

wherein Y is an oxygen or sulfur atom; $R^2$ is a hydrogen, chlorine, methyl or methoxy; $m_2$ is an integer of 1 or 2; and $n$ is 0 or 1.

2. A compound of the formula,

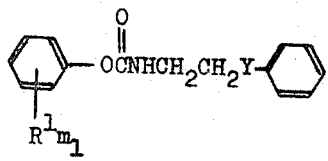

wherein $R^1$, Y and $m_1$ are as defined in claim 1.

3. A compound of the formula,

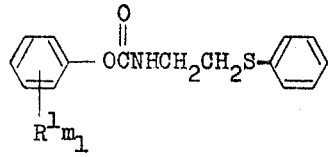

wherein $R^1$ and $m_1$ are as defined in claim 1.

4. A compound of the formula,

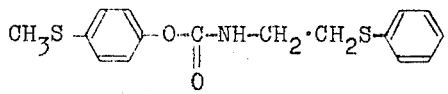

5. A compound of the formula,

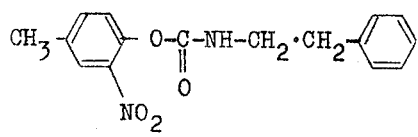

* * * * *